(12) United States Patent
Bailey

(10) Patent No.: US 12,243,442 B2
(45) Date of Patent: Mar. 4, 2025

(54) EDUCATIONAL GAME BALL

(71) Applicant: Janet Bailey, Gretna, LA (US)

(72) Inventor: Janet Bailey, Gretna, LA (US)

( * ) Notice: Subject to any disclaimer, the term of this patent is extended or adjusted under 35 U.S.C. 154(b) by 519 days.

(21) Appl. No.: 17/745,963

(22) Filed: May 17, 2022

(65) Prior Publication Data

US 2022/0277658 A1    Sep. 1, 2022

(51) Int. Cl.
| | | |
|---|---|---|
| *G09B 19/00* | (2006.01) | |
| *G09B 3/02* | (2006.01) | |
| *G09B 19/02* | (2006.01) | |
| *A63B 43/00* | (2006.01) | |

(52) U.S. Cl.
CPC ............ *G09B 3/02* (2013.01); *G09B 19/02* (2013.01); *A63B 43/00* (2013.01)

(58) Field of Classification Search
None
See application file for complete search history.

(56) References Cited

U.S. PATENT DOCUMENTS

| | | |
|---|---|---|
| 5,947,741 A | 9/1999 | Villarreal |
| 8,074,986 B1 | 12/2011 | Gebhart |
| 2008/0182230 A1 | 7/2008 | Stone |
| 2017/0333782 A1 | 11/2017 | Fjelstad |
| 2017/0348588 A1 | 12/2017 | Dimitriu |
| 2019/0027059 A1* | 1/2019 | Mitson ............... G09B 19/0038 |

OTHER PUBLICATIONS

Syllables Learning Center, Toss and teach, Jun. 2, 2019, pp. 1-2, Online Webpage at http://syllableslearningcenter.com/four-fun-outside-learning-activities/toss-and-teach/.

* cited by examiner

*Primary Examiner* — James B Hull
(74) *Attorney, Agent, or Firm* — Norton IP Law Firm LLC; Taylor M. Norton

(57) ABSTRACT

The present disclosure provides for a game ball for educational learning related play having a spherical body where the body has a plurality of flat exterior surfaces. The plurality of flat exterior surfaces include a plurality of groupings of three adjacent exterior flat surfaces. Each flat exterior surface of each of the groupings respectively have a flat flexible transparent pouch. Each flat flexible transparent pouch has a first slot opening opposite a second slot opening, and each flat flexible transparent pouch is respectively sized and configured to removably receive and secure an interchangeable educational index card in an installed position.

18 Claims, 12 Drawing Sheets

216 →

Reviewing the at least one mathematical question 122 on the front surface 120 of at least one interchangeable educational index card 114a disposed within a respective flat flexible transparent pouch 108 of the educational ball 100

218 →

Sliding the at least one interchangeable educational index card 114a out of the second slot opening 112 of said respective flat flexible transparent pouch 108 to remove said at least one interchangeable educational index card 114a from the educational game ball 110

220 →

Flipping over the at least one interchangeable educational index card 114a

222 →

Reviewing the mathematical answer on the back surface 126 of the at least one interchangeable educational index card 114a

224 →

Sliding the at least one interchangeable educational index card 114a through the first slot opening 110 of the respective flat flexible transparent pouch 108

FIG. 9

EDUCATIONAL GAME BALL

BACKGROUND OF THE INVENTION

Field of the Invention

The present invention generally relates to educational devices and more particularly relates to a game device for educational purposes.

Description of the Related Art

With the growing population of people, parents and teachers have the responsibility to effectively educate children. The traditional manner of teaching in conventional educational systems is not always best suited for all students. The use of rigid and standardized worksheets, reading and note taking can detract from the flexibility needed to meet the needs of many students. One example of the detrimental effects of such rigidity occurs when a student refuses to read a book or refuses to pay attention in class, particularly when teachers talk in the same tone of voice all the time. Students also get "bored" in class when the routine and structure become predictable to the point of boredom.

Over the years, various devices have been made to assist people with educating students. However, many such commonly known devices are of complex construction, overly sophisticated with technology, and often result in confusion of the students, thereby impeding the students' learning. Thus, while techniques currently exist that are used to teach subjects such as reading or language arts, as well as others, within an educational institution, challenges still exist, including the lack of educational tools, the lack of efficiency in engaging the attention and learning progress of individual students, and otherwise. Accordingly, it would be an improvement in the art to augment or even replace current techniques with other techniques. There is a need for a simple, handheld, and portable device for teachers and educators to easily and efficiently provide better learning experiences and education for the students.

While conventional teaching aids may be suitable for the particular purpose employed, they would not be as suitable for the purposes of the present invention as disclosed hereafter.

Accordingly, there is a need for a compact portable lightweight apparatus for engaging the students in an interactive learning environment.

As disclosed in this application, the inventor has discovered novel and unique devices and methods for efficient and engaging interactive learning for students, which exhibit superlative properties without being dependent on expensive or complex technological components.

Embodiments of the present invention provide for devices and methods and disclosed herein and as defined in the annexed claims which provide for improved educational features in order to actively engage the attention of students while educating the students about the subjects at hand.

SUMMARY OF THE INVENTION

It is one prospect of the present invention to provide one or more novel devices of simple but effective construction which can be applied to many environments to efficiently and effectively engage and educate students through educational learning related play.

The following presents a simplified summary of the present disclosure in a simplified form as a prelude to the more detailed description that is presented herein.

Therefore, in accordance with embodiments of the invention, there is provided a game ball for educational learning related play comprising a spherical body having a plurality of flat exterior surfaces, where the plurality of flat exterior surfaces includes a plurality of groupings of three adjacent exterior flat surfaces. Each flat exterior surface of each of the groupings respectively have a flat flexible transparent pouch. Preferably, each flat flexible transparent pouch is constructed of flexible plastic.

In a preferred embodiment, each flat flexible transparent pouch has a first slot opening opposite a second slot opening. Each flat flexible transparent pouch is respectively sized and configured to removably receive and secure an interchangeable educational index card in an installed position.

Preferably, each interchangeable educational card respectively has educational information displayed on a front surface of the interchangeable educational card, such that when the interchangeable educational index card is inserted through the first slot opening of the respective flat flexible transparent pouch into the installed position, the interchangeable educational index card displays educational information on said spherical body of the game ball through the flat flexible transparent pouch.

In one embodiment, the game ball further comprises a plurality of interchangeable educational index cards, and each interchangeable educational index card of the plurality of educational index cards is respectively disposed within the plurality of flat flexible transparent pouches.

In another embodiment, each grouping of the plurality of groupings of three adjacent exterior flat surfaces of the game ball for educational learning related play is respectively disposed in a spherically spaced relationship relative to each other grouping of the plurality of groupings of three adjacent exterior flat surfaces.

In one embodiment, the educational information on the interchangeable educational index cards of the game ball for educational learning related play includes mathematical equations. In another embodiment, the educational information comprises sight words. In yet another embodiment, the educational information includes spelling words.

In a preferred embodiment, the educational information includes vocabulary words adapted to be selected at the option of a user.

In yet another embodiment, the educational information comprises conversational introduction information including a first user's individual information, which is adapted to provide the first user's individual information to a second user, at the option of the first user. Preferably, the first user's individual information comprises information about the first user's business.

In accordance with other embodiments of the invention, there is provided a new method of educating students. The method of educating students includes a step of providing an educational game ball to the students, where the educational game ball has spherical body having a plurality of flat exterior surfaces, and the plurality of flat exterior surfaces include a plurality of groupings of three adjacent exterior flat surfaces, where each flat exterior surface of each of the groupings respectively comprises a flat flexible transparent pouch.

Preferably, each flat flexible transparent pouch has a first slot opening opposite a second slot opening, and each flat flexible transparent pouch is respectively sized and configured to removably receive and secure an interchangeable educational index card in an installed position.

In a preferred embodiment, each of the interchangeable educational cards respectively contains educational information displayed on a front surface of the interchangeable educational card. The educational information is adapted to be read by at least a first student user, such that when the interchangeable educational index card is inserted through the first slot opening of the respective flat flexible transparent pouch into the installed position, the interchangeable educational index card displays to the at least first student user the educational information while disposed on the spherical body of the educational game ball through the flat flexible transparent pouch.

In one embodiment, the method of educating students includes a step of providing a plurality of interchangeable educational index cards, wherein each interchangeable educational index card of the plurality of educational index cards is respectively disposed within the plurality of flat flexible transparent pouches of the educational game ball.

In a preferred embodiment, the method of educating students includes a step of tossing the educational game ball to the at least first student user to read the educational information that is displayed on the educational game ball through at least one of the flat flexible transparent pouches.

In another preferred embodiment, the method of educating students includes a step of sliding at least one interchangeable educational index card out of the second slot opening of the respective flat flexible transparent pouch, in order to remove the at least one interchangeable educational index card from the educational game ball.

In one embodiment, the method of educating students includes a step of providing an additional interchangeable educational index card to the at least first student user, where the additional interchangeable educational index card includes different educational information than the at least one interchangeable educational index card.

In another embodiment, the method of educating students includes a step of sliding the additional interchangeable educational index card through the first opening slot of the respective flat flexible transparent pouch.

In a preferred embodiment, the method of educating students further includes a step of tossing the educational game ball to at least a second student user, for the second student user to read the educational information displayed through at least one of the flat flexible transparent pouches.

Preferably, in the method of educating students, the educational information on the front surface of each respective interchangeable educational index card comprises at least one mathematical question, and each interchangeable educational index card respectively comprises a back surface, where the back surface of each interchangeable educational index card includes a respective mathematical answer to the respective at least one mathematical question of the front surface.

The method of educating students further includes a step of reviewing the at least one mathematical question on the front surface of at least one interchangeable educational index card disposed within a respective flat flexible transparent pouch of the educational ball.

The method of educating students further includes a step of sliding the at least one interchangeable educational index card out of the second slot opening of said respective flat flexible transparent pouch in order to remove the at least one interchangeable educational index card from the educational game ball.

Preferably, the method of educating students further includes a step of flipping over the at least one interchangeable educational index card; a step of reviewing the mathematical answer on the back surface of the at least one interchangeable educational index card; and a step of sliding the at least one interchangeable educational index card through the first opening slot of the respective flat flexible transparent pouch.

In one embodiment of the method of educating students, the educational information comprises sight words. In another embodiment, the educational information comprises spelling words. In yet another embodiment, the educational information comprises vocabulary words adapted to be selected by a teacher.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which like numerals throughout the figures identify substantially similar components, in which:

FIG. 9 illustrates another exemplary method of educating students in accordance with embodiments of the invention;

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

As used herein, homogeneous is defined as the same in all locations, and a homogeneous material is a material of uniform composition throughout that cannot be mechanically separated into different materials. Examples of "homogeneous materials" are certain types of plastics, ceramics, metals, alloys, paper, board, resins, high-density polyethylene and rubber.

Figure 1:
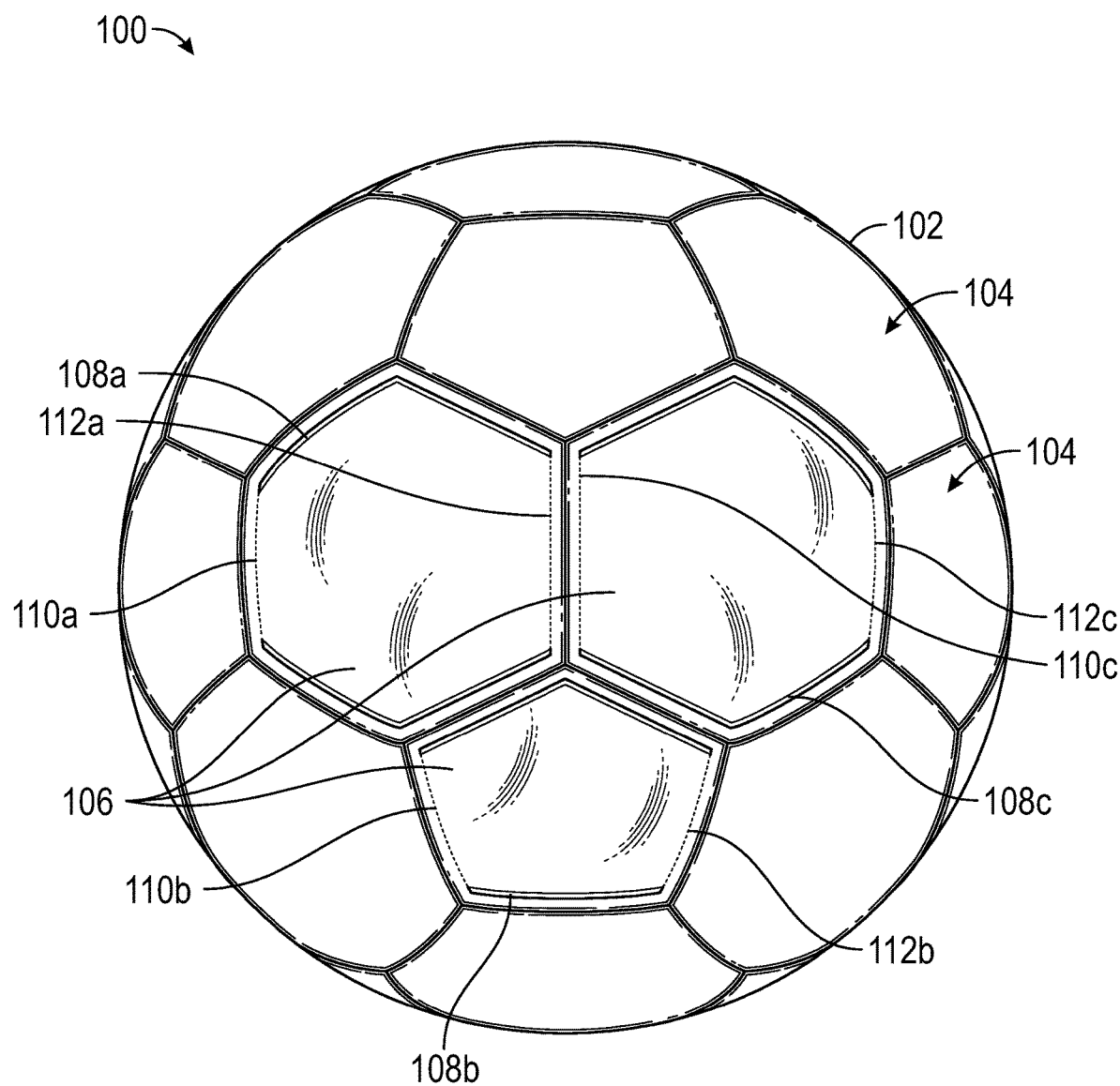
FIG. 1 is a front elevation view of an exemplary game ball for educational learning related play, in accordance with embodiments of the invention.
Figure 2:
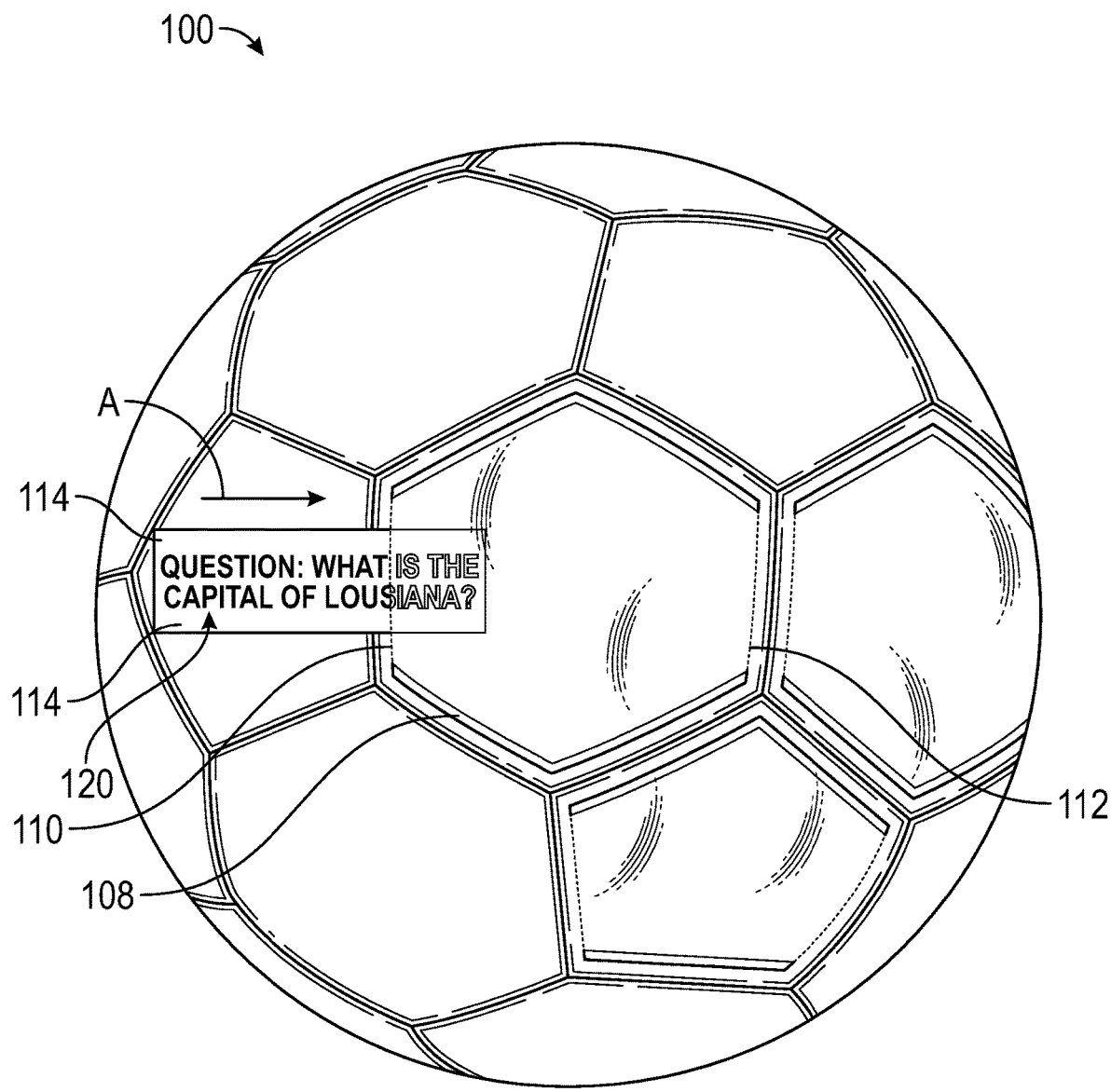
FIG. 2 is a left perspective view of a game ball for educational learning related play with an exemplary interchangeable educational card partially inserted into a flat flexible pouch, in accordance with embodiments of the invention.
Figure 3:
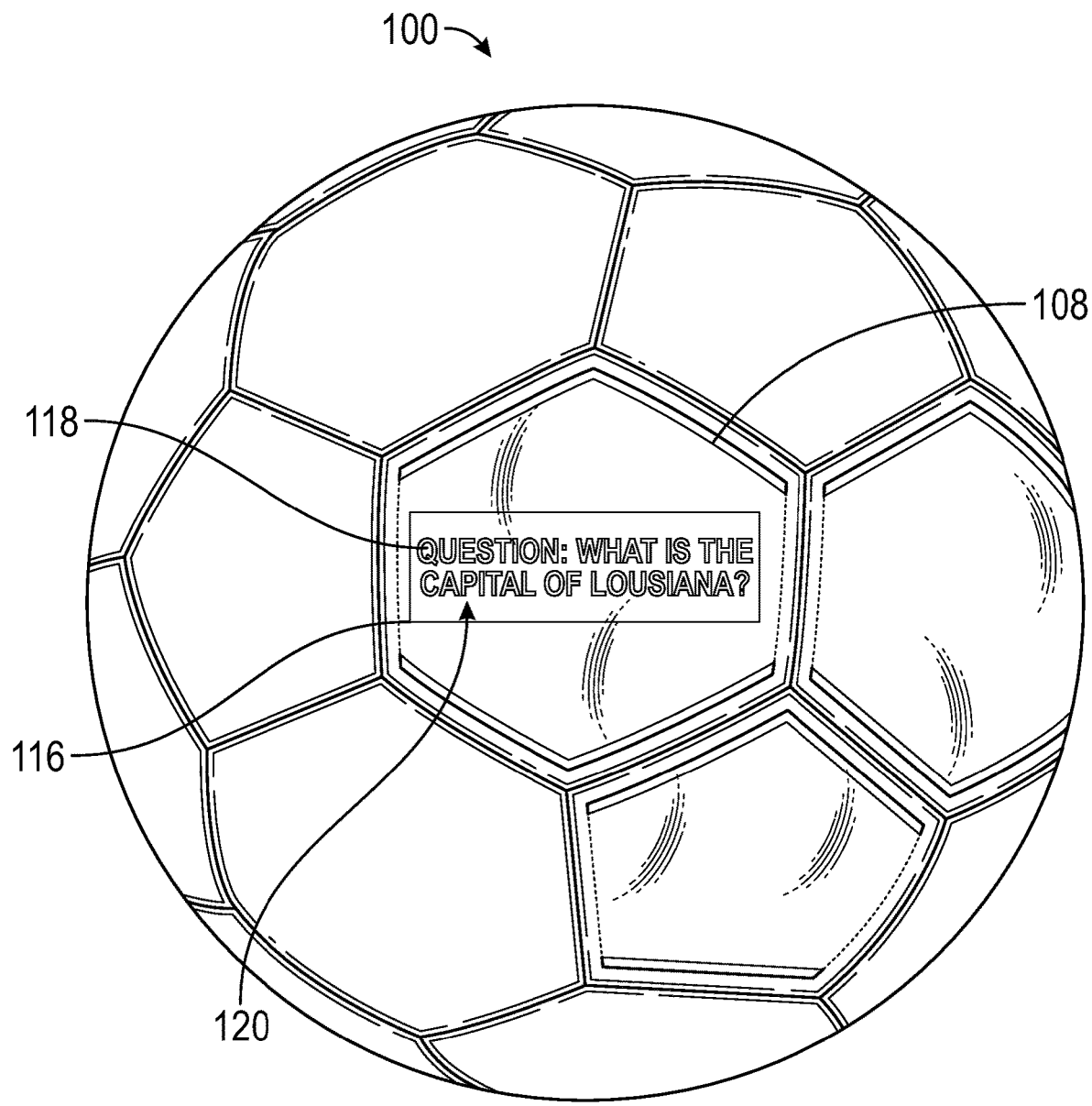
FIG. 3 is a left perspective view of a game ball for educational learning related play with an exemplary interchangeable educational card in an installed position, in accordance with embodiments of the invention.

Referring initially to FIGS. 1-3, the basic constructional details and principles of operation of one embodiment of a game ball for educational learning related play 100 according to a preferred embodiment of the present invention will be discussed.

In FIG. 1, a game ball for educational learning related play 100 according to a preferred embodiment of the present invention is provided. As illustrated in FIGS. 1-3, the game ball for educational learning related play 100 comprises a spherical body 102 having a plurality of flat exterior surfaces 104, where the plurality of flat exterior surfaces 104 include a plurality of groupings 106 of three adjacent exterior flat surfaces 104. Each flat exterior surface 104 of each of the groupings 106 respectively have a flat flexible transparent pouch 108 (e.g., 108a, 108b, 108c). Preferably, each flat flexible transparent pouch 108 is constructed of flexible plastic.

As illustrated in FIGS. 1-2, each flat flexible transparent pouch 108 preferably has a first slot opening 110 (e.g., 110a, 110b, 110c) opposite a second slot opening 112 (e.g., 112a, 112b, 112c). Each flat flexible transparent pouch 108 is respectively sized and configured to removably receive and secure an interchangeable educational index card 114 in an installed position 116, as illustrated in FIGS. 3-6.

Preferably, each interchangeable educational card 114 respectively has educational information 118 displayed on a front surface 120 of the interchangeable educational card, such that when the interchangeable educational index card is inserted, for example in the direction Arrow A in FIG. 2, through the first slot opening 110 of the respective flat flexible transparent pouch into the installed position 116, as illustrated in FIG. 3, the interchangeable educational index card displays educational information 118 on said spherical body 102 of the game ball 100 through the flat flexible transparent pouch.

Figure 5:
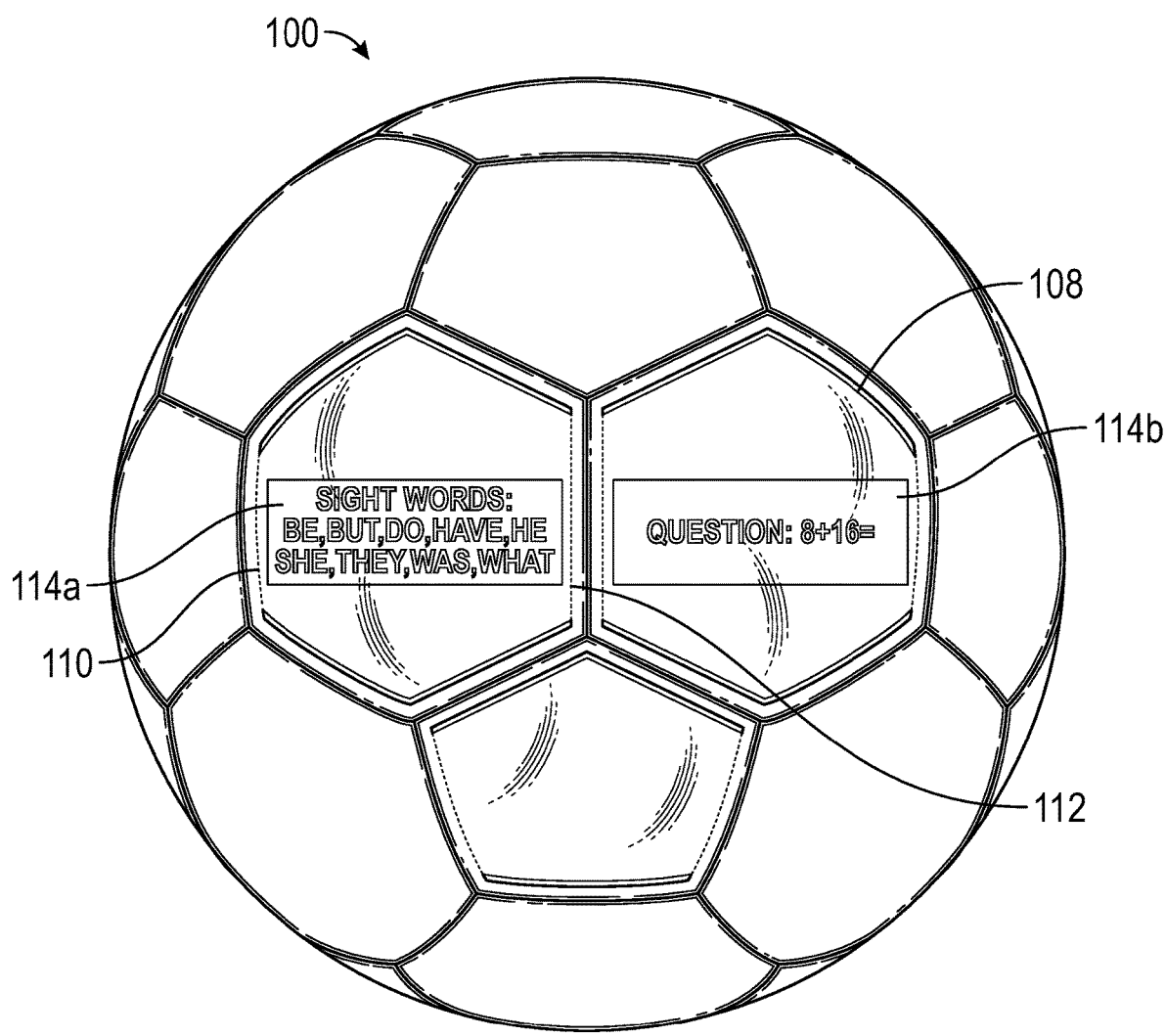
FIG. 5 is a front elevation view of an exemplary game ball for educational learning related play with an exemplary interchangeable educational card inserted in an installed position and an exemplary additional interchangeable educational card inserted in an installed position, in accordance with embodiments of the invention.
Figure 6:
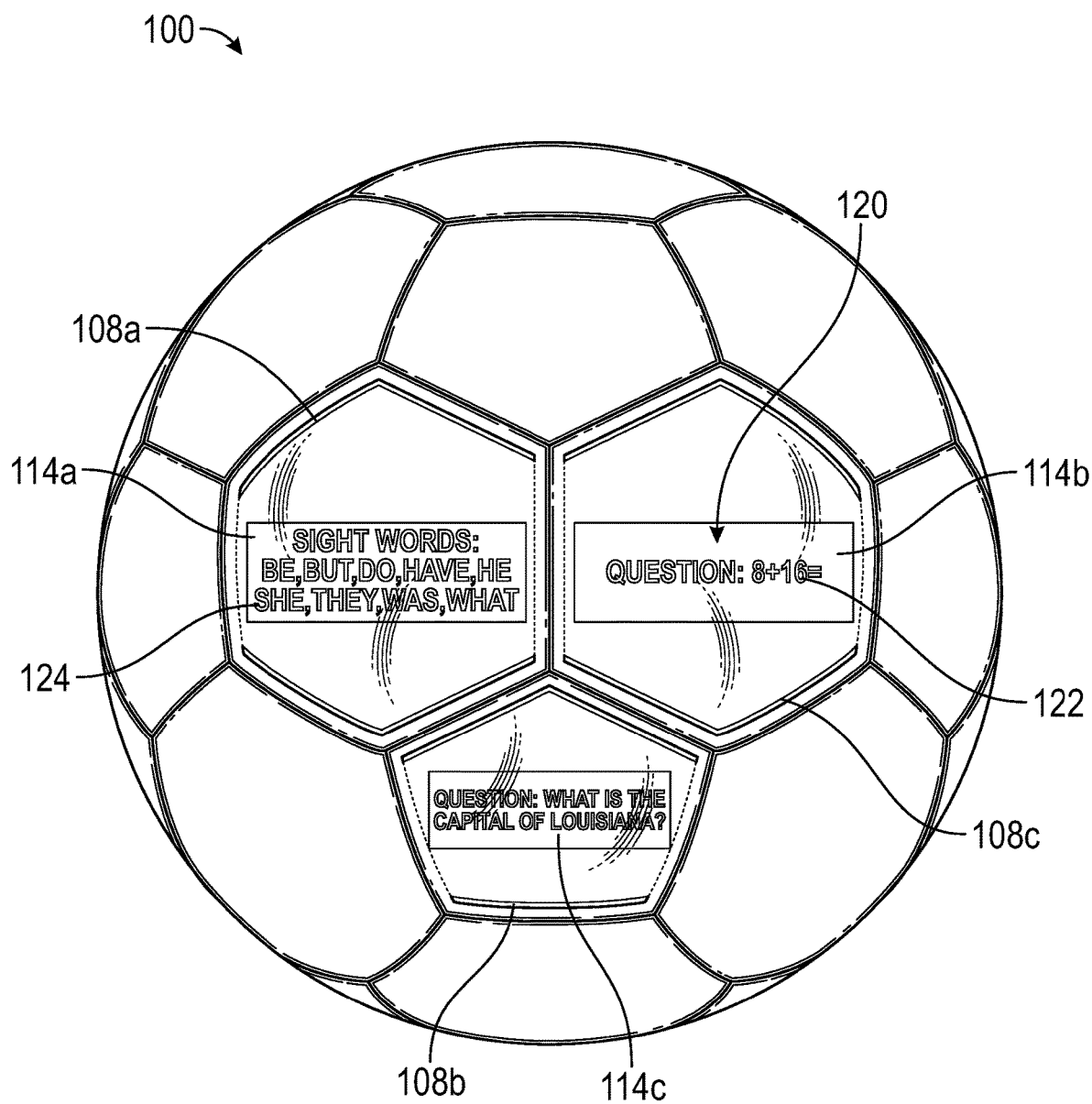
FIG. 6 is a front elevation view of a game ball for educational learning related play with exemplary interchangeable educational cards respectively in an installed position, in accordance with embodiments of the invention.

Referring to FIGS. 5-6, in one embodiment, the game ball 100 further comprises a plurality of interchangeable educational index cards 114a, 114b, 114c, and each interchangeable educational index card 114 of the plurality of educational index cards is respectively disposed within the plurality of flat flexible transparent pouches 108a, 108b, 108c.

Figure 4:
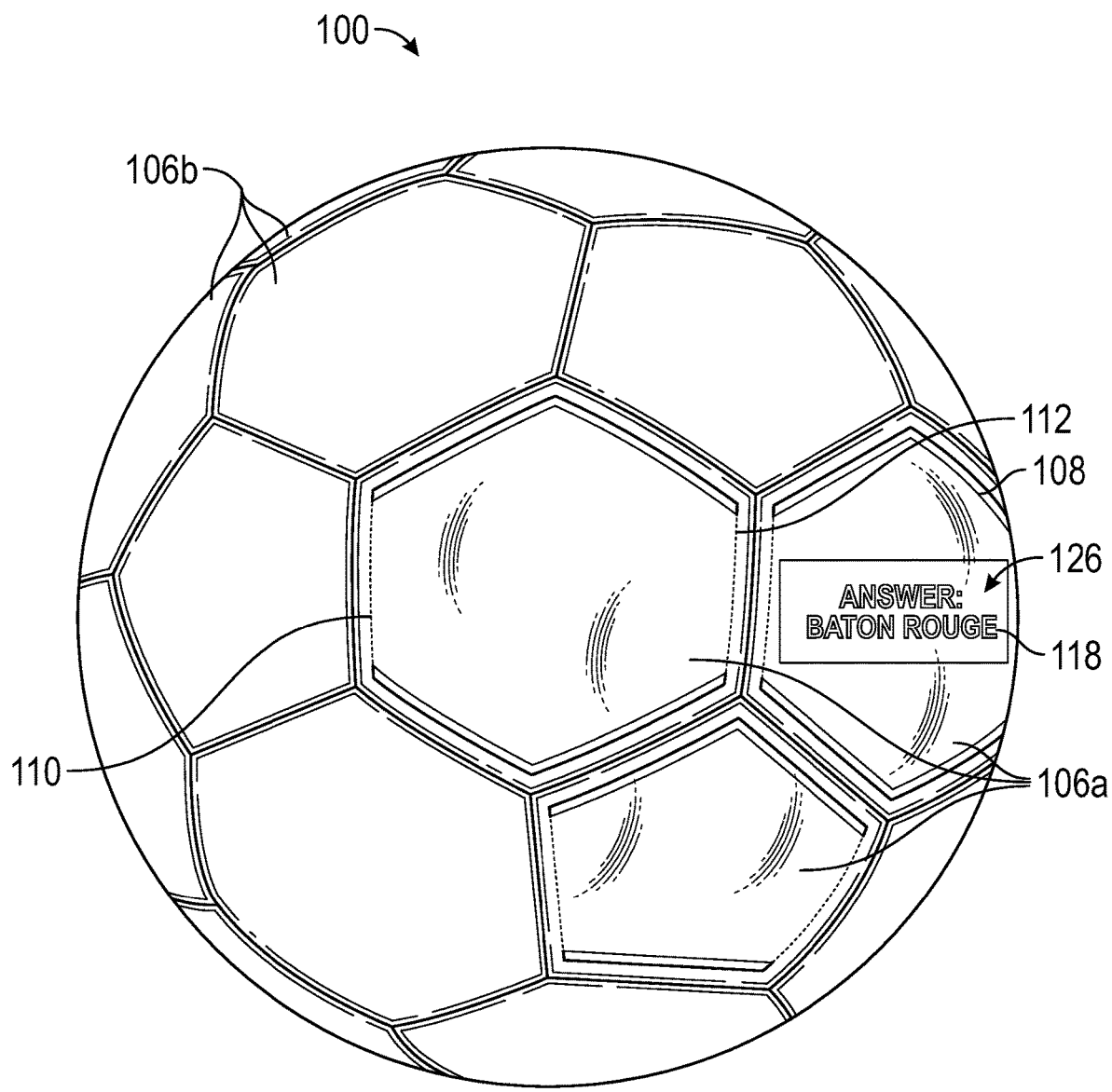
FIG. 4 is a left perspective view of a game ball for educational learning related play with an exemplary additional interchangeable educational card inserted in an installed position, in accordance with embodiments of the invention.

As illustrated in FIG. 4, preferably, each grouping 106a of the plurality of groupings 106 of three adjacent exterior flat surfaces 104 of the game ball for educational learning related play 100 is respectively disposed in a spherically spaced relationship relative to each other grouping, 106b of the plurality of groupings 106 of three adjacent exterior flat surfaces 104.

In one embodiment, the educational information 118 on the interchangeable educational index cards of the game ball for educational learning related play 100 includes mathematical equations 122, as exemplified in FIG. 6. In another embodiment, the educational information comprises sight words 124, as further exemplified in FIG. 6. In yet another embodiment, the educational information includes spelling words.

In one embodiment, the educational information includes vocabulary words adapted to be selected at the option of a user. In such embodiment, a teacher can select vocabulary words of interest, such as sight words 124 for example, for a particular class, and the educational information displayed on the interchangeable educational index cards includes the vocabulary words 124 selected by the teacher. As can be appreciated from this disclosure, embodiments of the disclosed invention of the educational game ball 100 allows teachers to customize the educational information being taught to the students.

For example, in a preferred embodiment, the educational information includes geography questions and answers, as illustrated in FIGS. 3-4.

In yet another embodiment, the educational information comprises conversational introduction information including a first user's individual information, which is adapted to provide the first user's individual information to a second user, at the option of the first user. Preferably, the first user's individual information comprises information about the first user's business.

Figure 7:
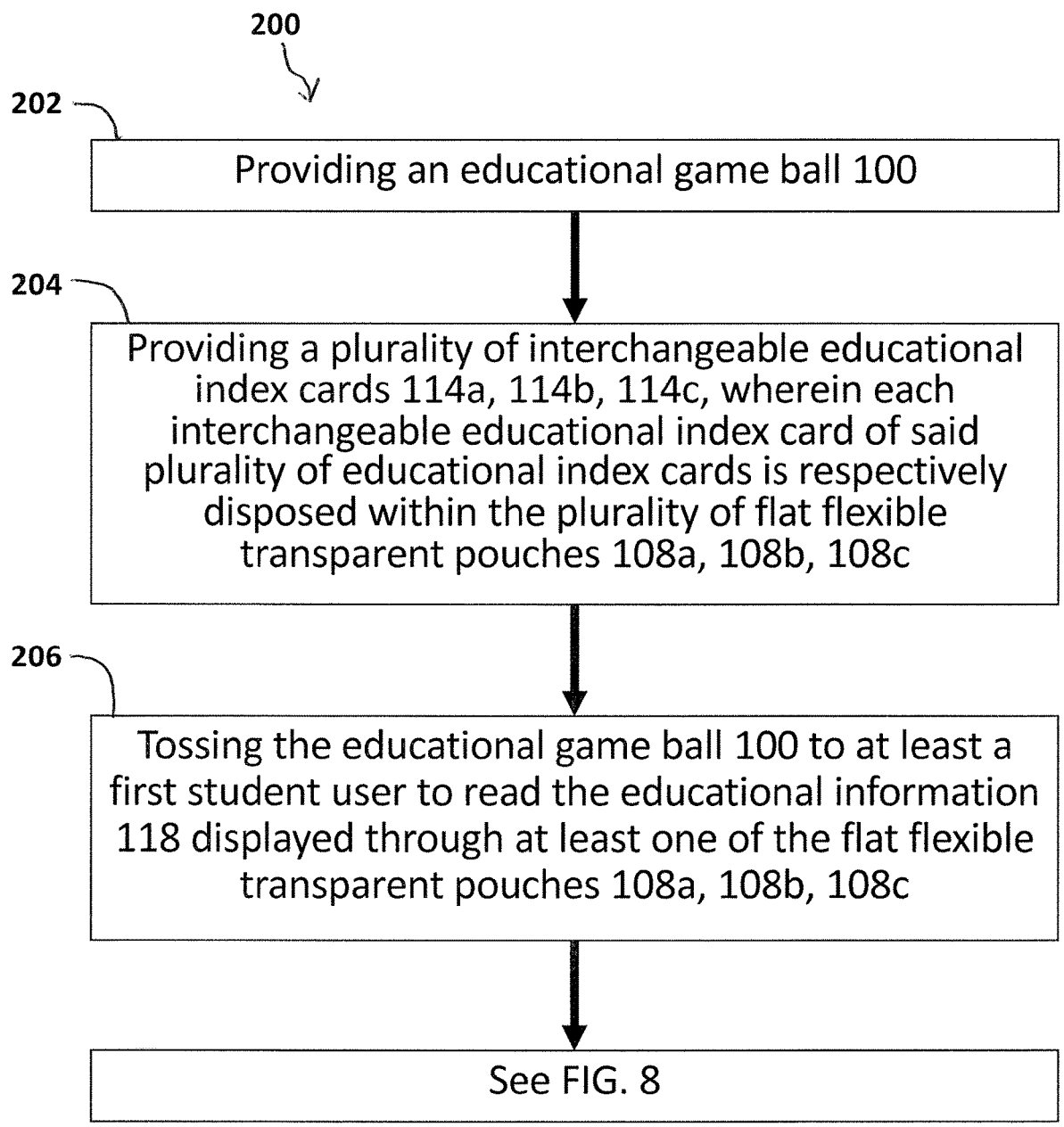
FIG. 7 illustrates an exemplary method of educating students in accordance with embodiments of the invention.
Figure 8:
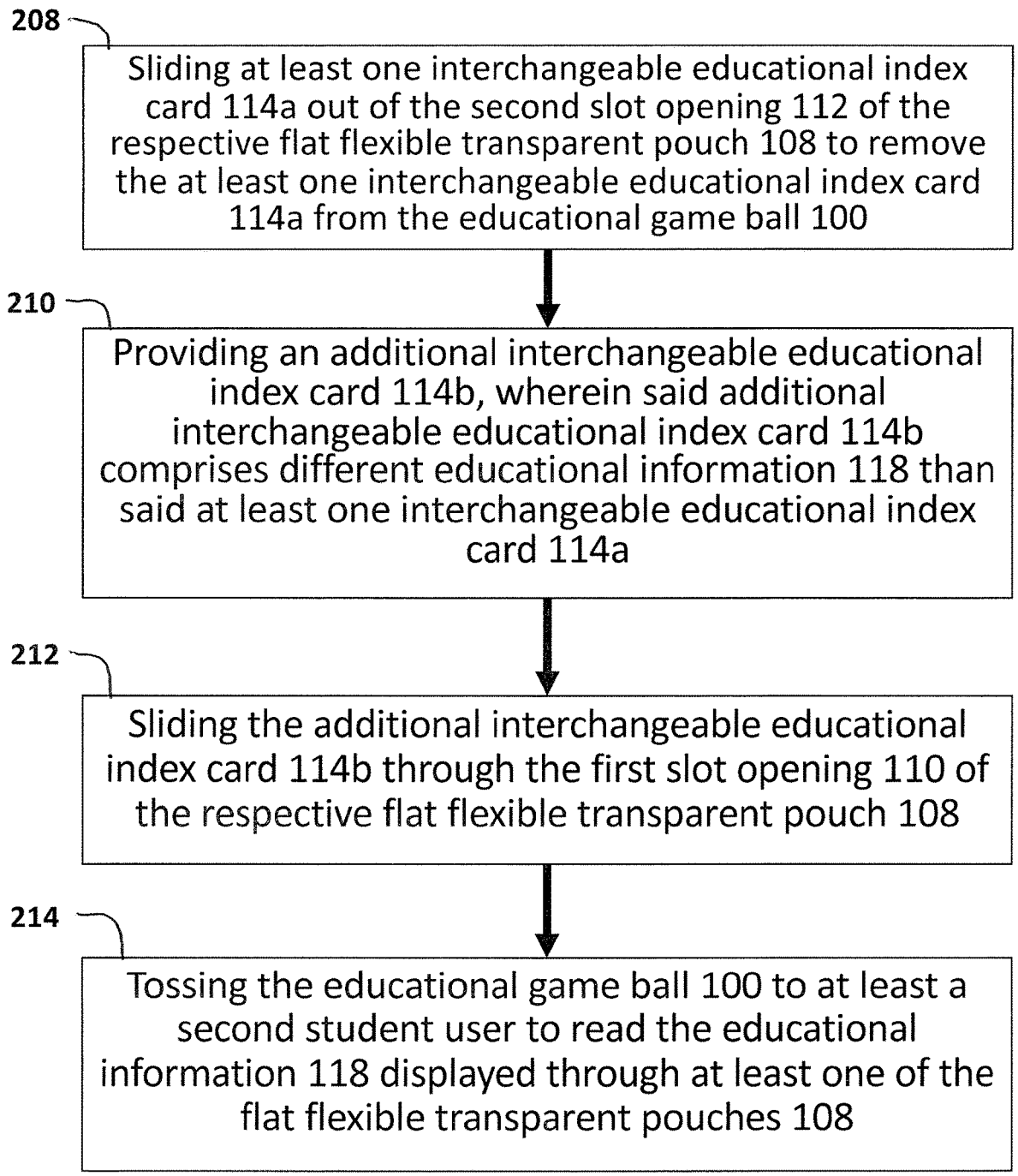
FIG. 8 illustrates another exemplary method of educating students in accordance with embodiments of the invention.

Referring to FIGS. 7-9, in accordance with other embodiments of the invention, there is provided a new method of educating students 200. The method of educating students 200 includes a step 202 of providing an educational game ball 100 to the students, where the educational game ball 100 has spherical body 102 having a plurality of flat exterior surfaces, and the plurality of flat exterior surfaces include a plurality of groupings 106 of three adjacent exterior flat surfaces 104, where each flat exterior surface of each of the groupings 106 respectively comprises a flat flexible transparent pouch 108.

Preferably, each flat flexible transparent pouch 108 has a first slot opening 110 opposite a second slot opening 112, and each flat flexible transparent pouch 108 is respectively sized and configured to removably receive and secure an interchangeable educational index card in an installed position 116.

In a preferred embodiment, each of the interchangeable educational cards respectively contains educational information displayed on a front surface of the interchangeable educational card. The educational information is adapted to be read by at least a first student user, such that when the interchangeable educational index card is inserted through the first slot opening 110 of the respective flat flexible transparent pouch 108 into the installed position 116, the interchangeable educational index card displays to the at least first student user the educational information 118 while disposed on the spherical body 102 of the educational game ball 100 through the flat flexible transparent pouch 108.

In one embodiment, the method of educating students includes a step 204 of providing a plurality of interchangeable educational index cards, wherein each interchangeable educational index card of the plurality of educational index cards is respectively disposed within the plurality of flat flexible transparent pouches 108 of the educational game ball 100.

In a preferred embodiment, the method of educating students includes a step 206 of tossing the educational game ball 100 to the at least first student user to read the educational information 118 that is displayed on the educational game ball 100 through at least one of the flat flexible transparent pouches 108a, 108b, 108c, as illustrated in FIG. 6.

Referring to FIG. 8, in another preferred embodiment, the method of educating students includes a step 208 of sliding at least one interchangeable educational index card out of the second slot opening 112 of the respective flat flexible transparent pouch 108, in order to remove the at least one interchangeable educational index card 114 (e.g., 114a) from the educational game ball 100.

Preferably, the method of educating students 200 includes a step 210 of providing an additional interchangeable educational index card to the at least first student user, where the additional interchangeable educational index card 114b includes different educational information 118 than the at least one interchangeable educational index card 114a.

In another embodiment, the method of educating students 200 includes a step 212 of sliding the additional interchangeable educational index card through the first slot opening 110 of the respective flat flexible transparent pouch 108, as exemplified in FIGS. 2-3, into the installed position 116.

In a preferred embodiment, the method of educating students 200 further includes a step 214 of tossing the educational game ball 100 to at least a second student user, for the second student user to read the educational information 118 displayed through at least one of the flat flexible transparent pouches 108a, 108b, 108c.

Referring to FIG. 9, another preferred method 200 of educating students is disclosed, where the educational information on the front surface 120 of each respective interchangeable educational index card 114 comprises at least one mathematical question, and each interchangeable educational index card 114 respectively comprises a back surface 126, where the back surface 126 of each interchangeable educational index card 114 includes a respective mathematical answer to the respective at least one mathematical question 122 of the front surface 120, as seen in FIG. 6.

As illustrated in FIG. 9, the method of educating students includes a step 216 of reviewing the at least one mathematical question on the front surface 120 of at least one interchangeable educational index card 114 disposed within a respective flat flexible transparent pouch 108 of the educational ball.

The method of educating students further includes a step 218 of sliding the at least one interchangeable educational index card 114 out of the second slot opening 112 of said respective flat flexible transparent pouch 108 in order to remove the at least one interchangeable educational index card 114 from the educational game ball 100.

Preferably, the method of educating students further includes a step 220 of flipping over the at least one interchangeable educational index card 114; a step 222 of reviewing the mathematical answer on the back surface 126 of the at least one interchangeable educational index card 114; and a step 224 of sliding the at least one interchangeable educational index card 114 through the first opening slot of the respective flat flexible transparent pouch 108.

In another embodiment of the method of educating students, the educational information 118 comprises sight words 124.

Figure 10:
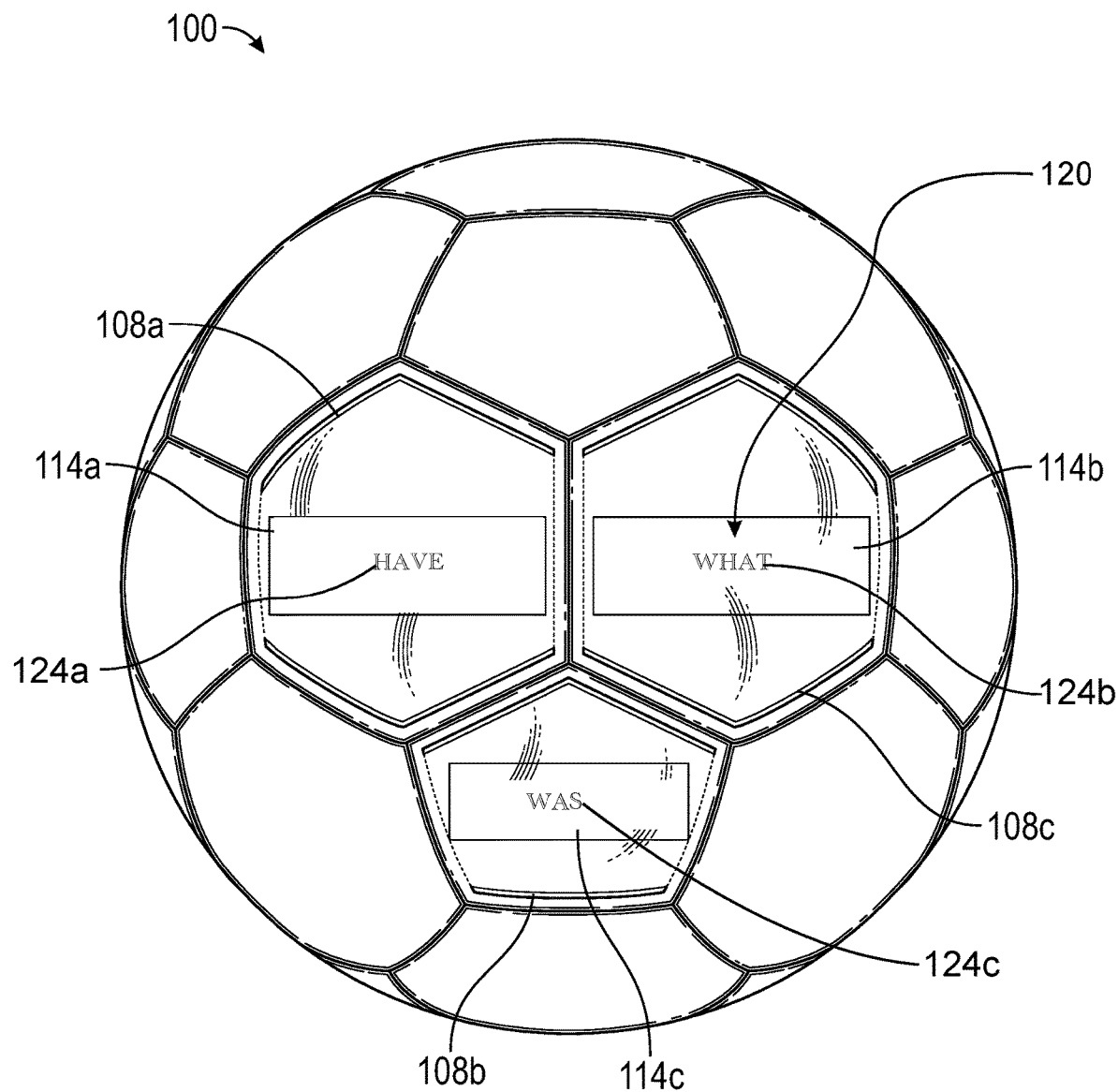
FIG. 10 is a front elevation view of a game ball for educational learning related play with three (3) exemplary interchangeable educational cards displaying individual sight words respectively in an installed position, in accordance with embodiments of the invention.

In a preferred embodiment, as illustrated in FIG. 10, preferably, there are three (3) separate sight words 124a, 124b, 124c (e.g., "HAVE", "WHAT", and "WAS") displayed in three (3) respective separate interchangeable educational index cards 114a, 114b, 114c.

In yet another embodiment, ably, there are three (3) separate sight words 124a, 124b, 124c (e.g., "HAVE", "WHAT", and "WAS") displayed in three (3) respective separate interchangeable educational index cards 114a, 114b, 114c.

Figure 11:
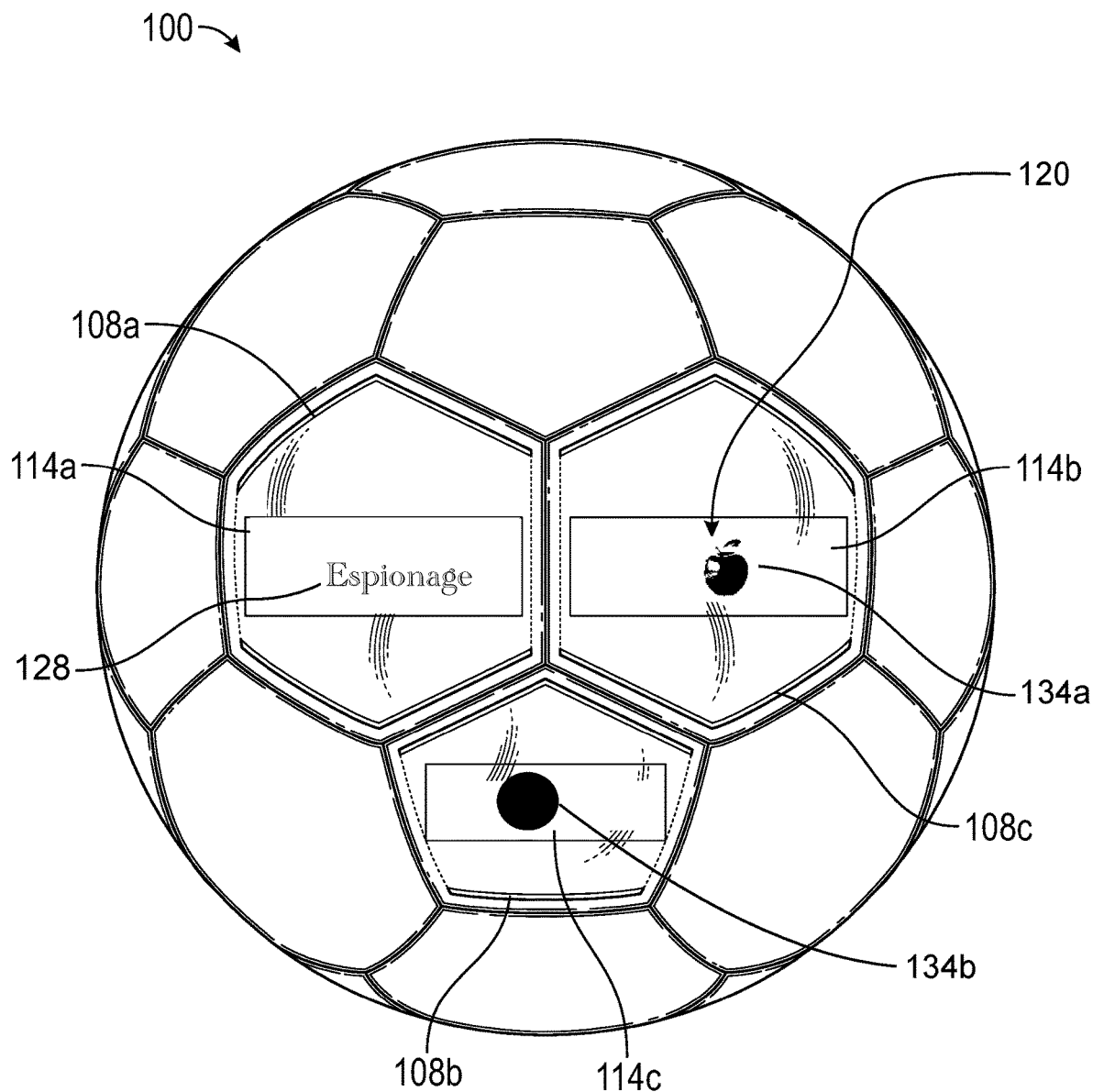
FIG. 11 is a front elevation view of a game ball for educational learning related play with three (3) exemplary interchangeable educational cards respectively in an installed position, displaying the front of the interchangeable educational cards, in accordance with embodiments of the invention.
Figure 12:
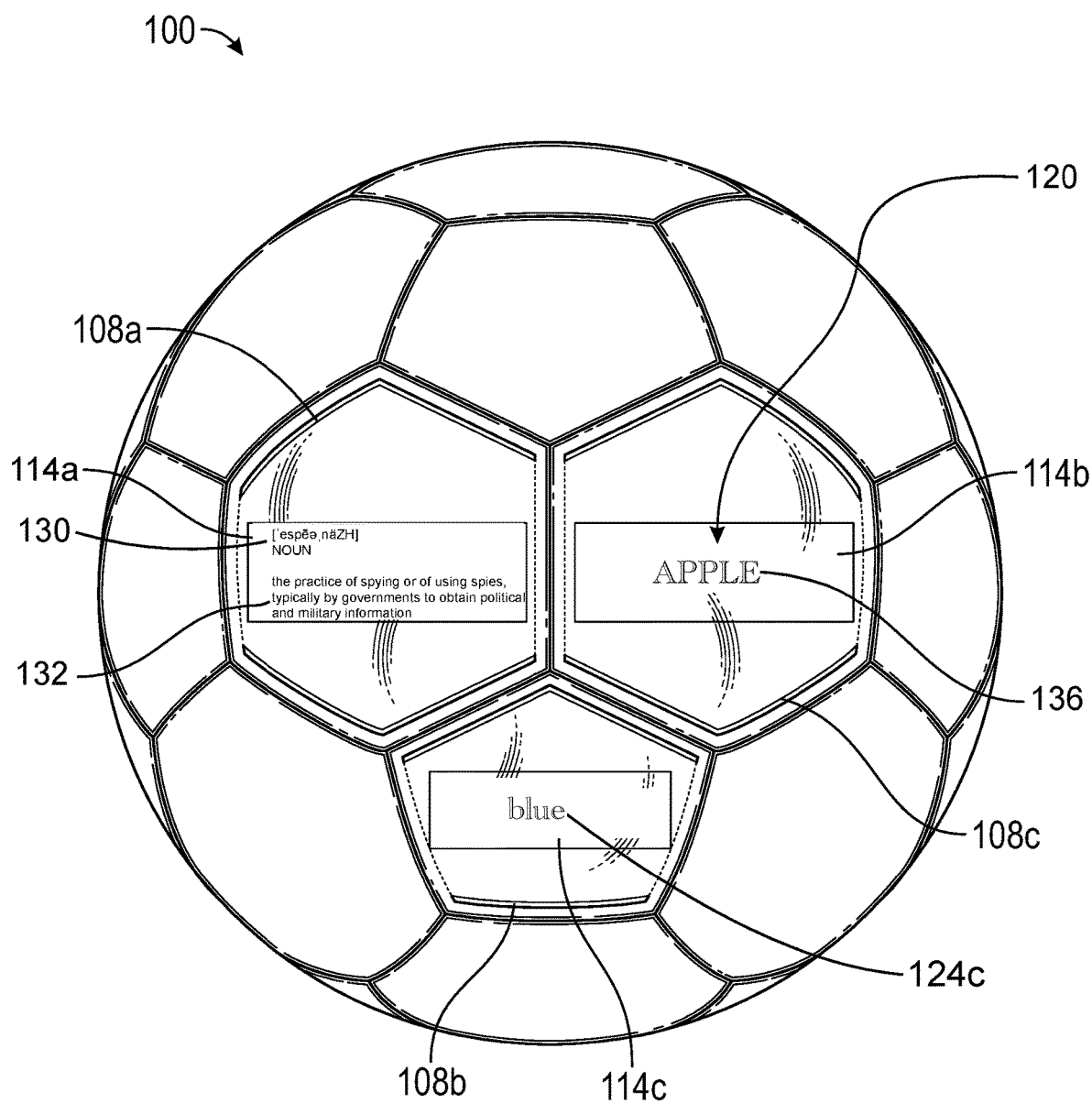
FIG. 12 is front elevation view of the game ball for educational learning related play of FIG. 11 with the exemplary interchangeable educational cards respectively in an installed position, displaying the back of the interchangeable educational cards of FIG. 11, in accordance with embodiments of the invention.

In another embodiment, the educational information 118 comprises spelling words 128. In yet another embodiment, the educational information 118 comprises vocabulary words 128 adapted to be selected by a teacher. As illustrated in FIG. 11, the front of an interchangeable educational index card 114 displays a spelling or vocabulary word 128 (e.g. "Espionage"), and the back of the interchangeable educational index card 114a displays the word 128 as broken down into syllables 130 to aid as user such as a student in a pronunciation of the word 128; and the back of the interchangeable educational index card 114a also displays as well as displays the definition 132 of the word, as illustrated in FIG. 12.

In yet another embodiment, the front of the interchangeable educational index card 114b displays an image of an object 134 such as, for example, an apple 134a, as illustrated in FIG. 11. As illustrated in FIG. 12, the back of that same interchangeable educational index card 114b displays a word 136 (e.g., "APPLE") identifying the object 134a that is displayed on the front of that interchangeable educational index card 114b.

In another preferred embodiment, the front of the interchangeable educational index card 114c displays an object 134b having a particular color such as, for example, the color blue, as illustrated in FIG. 11. As illustrated in FIG. 12, the back of that same interchangeable educational index card 114c displays a word 124c (e.g., "blue") identifying the color of the object 134b that is displayed on the front of that interchangeable educational index card 114c.

All U.S. patents and publications identified herein are incorporated in their entirety by reference thereto.

The claimed invention is:

1. A game ball for educational learning related play, comprising:

a spherical body having a plurality of flat exterior surfaces, said plurality of flat exterior surfaces comprising a plurality of groupings of three adjacent exterior flat surfaces, wherein each flat exterior surface of each of said groupings respectively comprises a flat flexible transparent pouch comprising a first slot opening opposite a second slot opening, each flat flexible transparent pouch respectively sized and configured to removably receive and secure an interchangeable educational index card in an installed position, each said interchangeable educational card respectively having educational information displayed on a front surface thereon, such that when the interchangeable educational index card is inserted through the first slot opening of the respective flat flexible transparent pouch into the installed position, said interchangeable educational index card displays educational information on said spherical body through the flat flexible transparent pouch.

2. The game ball for educational learning related play of claim 1, further comprising a plurality of interchangeable educational index cards, wherein each interchangeable educational index card of said plurality of educational index cards is respectively disposed within the plurality of flat flexible transparent pouches.

3. The game ball for educational learning related play of claim 2, wherein each grouping of said plurality of groupings of three adjacent exterior flat surfaces is respectively disposed in a spherically spaced relationship relative to each other grouping of said plurality of groupings of three adjacent exterior flat surfaces.

4. The game ball for educational learning related play of claim 3, wherein the educational information comprises mathematical equations.

5. The game ball for educational learning related play of claim 3, wherein the educational information comprises sight words.

6. The game ball for educational learning related play of claim 3, wherein the educational information comprises spelling words.

7. The game ball for educational learning related play of claim 3, wherein the educational information comprises vocabulary words selected at the option of a user.

8. The game ball for educational learning related play of claim 3, wherein the educational information comprises conversational introduction information comprising a first user's individual information adapted to provide the first user's individual information to a second user, at the option of the first user.

9. The game ball for educational learning related play of claim 8, wherein the first user's individual information comprises information about the first user's business.

10. The game ball for educational learning related play of claim 3, wherein each flat flexible transparent pouch is constructed of flexible plastic.

11. A method of educating students, comprising:
a step of providing an educational game ball having spherical body having a plurality of flat exterior surfaces, said plurality of flat exterior surfaces comprising a plurality of groupings of three adjacent exterior flat surfaces, wherein each flat exterior surface of each of said groupings respectively comprises a flat flexible transparent pouch comprising a first slot opening opposite a second slot opening, each flat flexible transparent pouch respectively sized and configured to removably receive and secure an interchangeable educational index card in an installed position, each said interchangeable educational card respectively having educational information displayed on a front surface thereon adapted to be read by at least a first student user, such that when the interchangeable educational index card is inserted through the first slot opening of the respective flat flexible transparent pouch into the installed position, said interchangeable educational index card displays to said at least first student user educational information on said spherical body through the flat flexible transparent pouch;

a step of providing a plurality of interchangeable educational index cards, wherein each interchangeable educational index card of said plurality of educational index cards is respectively disposed within the plurality of flat flexible transparent pouches;

s step of tossing the educational game ball to the at least first student user to read the educational information displayed through at least one of the flat flexible transparent pouches.

12. The method of educating students of claim 11, further comprising:
a step of sliding at least one interchangeable educational index card out of the second slot opening of the respective flat flexible transparent pouch to remove the at least one interchangeable educational index card from the educational game ball;

a step of providing an additional interchangeable educational index card, wherein said additional interchangeable educational index card comprises different educational information than said at least one interchangeable educational index card; and a step of sliding the additional interchangeable educational index card through the first slot opening of the respective flat flexible transparent pouch.

13. The method of educating students of claim 12, further comprising a step of tossing the educational game ball to at least a second student user to read the educational information displayed through at least one of the flat flexible transparent pouches.

14. The method of educating students of claim 11, wherein the educational information on the front surface of each respective interchangeable educational index card comprises at least one mathematical question, wherein each interchangeable educational index card respectively comprises a back surface, wherein the back surface of each interchangeable educational index card comprises a respective mathematical answer to the respective at least one mathematical question of the front surface.

15. The method of educating students of claim 14, further comprising:
a step of reviewing the at least one mathematical question on the front surface of at least one interchangeable educational index card disposed within a respective flat flexible transparent pouch of the educational ball;

a step of sliding the at least one interchangeable educational index card out of the second slot opening of said respective flat flexible transparent pouch to remove said at least one interchangeable educational index card from the educational game ball;

a step of flipping over the at least one interchangeable educational index card;

a step of reviewing the mathematical answer on the back surface of the at least one interchangeable educational index card; and a step of sliding the at least one interchangeable educational index card through the first slot opening of the respective flat flexible transparent pouch.

16. The method of educating students of claim 11, wherein the educational information comprises sight words.

17. The method of educating students of claim 11, wherein the educational information comprises spelling words.

18. The method of educating students of claim 11, wherein the educational information comprises vocabulary words adapted to be selected by a teacher.

\* \* \* \* \*